United States Patent
Boesinger et al.

(10) Patent No.: US 6,832,283 B2
(45) Date of Patent: Dec. 14, 2004

(54) METHOD FOR ADDRESSING NETWORK COMPONENTS

(75) Inventors: Marcus Boesinger, Stuttgart (DE); Rainer Krumrein, Backnang (DE); Jutta Schneider, Tuebingen (DE)

(73) Assignee: DaimlerChrysler AG, Stuttgart (DE)

(*) Notice: Subject to any disclaimer, the term of this patent is extended or adjusted under 35 U.S.C. 154(b) by 550 days.

(21) Appl. No.: 09/881,044

(22) Filed: Jun. 15, 2001

(65) Prior Publication Data

US 2002/0046309 A1 Apr. 18, 2002

(30) Foreign Application Priority Data

Jun. 15, 2000 (DE) .......................................... 100 29 645

(51) Int. Cl.⁷ ............................................. G06F 13/00
(52) U.S. Cl. ............................ 710/315; 710/104; 710/8; 710/9
(58) Field of Search ................................ 710/8, 9, 104, 710/305, 306, 313, 315; 370/313, 352; 455/656.1, 575.9; 701/29, 32, 36

(56) References Cited

U.S. PATENT DOCUMENTS

| | | | |
|---|---|---|---|
| 5,732,074 A | 3/1998 | Spaur et al. | |
| 6,377,825 B1 * | 4/2002 | Kennedy et al. | 455/569.2 |
| 6,430,164 B1 * | 8/2002 | Jones et al. | 370/313 |
| 6,667,968 B1 * | 12/2003 | Tran | 370/352 |
| 2002/0025832 A1 * | 2/2002 | Durian et al. | 455/556 |
| 2002/0038369 A1 * | 3/2002 | Sung et al. | 709/227 |

FOREIGN PATENT DOCUMENTS

| | | | |
|---|---|---|---|
| DE | 40 37 143 | 5/1992 | |
| DE | 197 39 297 | 3/1999 | |
| DE | 198 27 337 | 12/1999 | |
| WO | WO 01/26337 A2 * | 4/2001 | H04L/29/06 |

OTHER PUBLICATIONS

Media Oriented Systems Transport (MOST) Specification Framework Rev. 1.1, Version 1.1–07, MOST Cooperation Administration, 1999.*

MOST MAMAC Specification Rev. 1.1, Version 1.1–00, MOST Cooperation Administration, Dec. 2003.*

* cited by examiner

Primary Examiner—Glenn A. Auve
(74) Attorney, Agent, or Firm—Crowell & Moring LLP

(57) ABSTRACT

Method for addressing components of a first network, especially in the case of data bus systems in transport vehicles, in which each component is assigned a first address for the mutual communication within the network and the first addresses are stored in a central register, in which at least one particular component of the first network communicates with another network, this component, when dialling into the second network, is assigned a second address by the latter and, within the first network, addressing takes place on the basis of function-specific address components, identical function blocks of the components being addressed via identical function-specific address components.

22 Claims, 2 Drawing Sheets

| LogicalAddr | FunctionAddr | InstAddr | IP Addr |
|---|---|---|---|
| 0x100 | 0x22 | 0 | 10.0.22.1 |
|  | 0x06 | 1 |  |
|  | 0x08 | 1 |  |
|  | 0x40 | 1 |  |
| 0x101 | 0x51 | 0 | 10.0.51.1 |
|  | 0x06 | 2 |  |
| 0x102 | 0x33 | 1 | 10.0.33.2 |
| 0x103 | 0x33 | 2 | 10.0.33.3 |
| 0x104 | 0x60 | 0 | 10.0.60.1 |
|  | 0x40 | 2 |  |
|  | 0x06 | 3 |  |
|  | 0x08 | 2 |  |

Fig. 2

METHOD FOR ADDRESSING NETWORK COMPONENTS

BACKGROUND AND SUMMARY OF THE INVENTION

This application claims the priority of German Application No. 100 29 645.9, filed Jun. 15, 2000, the disclosure of which is expressly incorporated by reference herein.

The invention relates to a method for addressing components of a network, especially in the case of data bus systems in transport means, in which each component is assigned a first address for the mutual communication within the network and the first addresses are stored in a central register.

Today, electronic components in transport means, for example aircraft, ships, trains or motor vehicles, are no longer connected to one another via a multiplicity of individual cable strands which are combined to form cable trees or harnesses, but via one or more networks. Such networks use a data bus in transport means that can consist of metal conductors connected to the components in the form of a ring or in the form of a star, or of optical fiber or transparent plastic data bus lines in the case of an optical data bus.

The addressing of the individual components is a central subject in connection with vehicle data buses. Since many variants are possible in the production of the vehicle, this also entails a different configuration of the data bus and its components. Thus, individual components can be omitted or also provided several times. To ensure that each individual component of the data bus is known for the data traffic, and in order to be able to address each component in a defined manner, an address is issued for each component.

German Patent document DE 198 27 337 A1 shows a data bus which is preferably used in entertainment electronics. This concerns a time-synchronous data transmission in which the data transmitted are synchronized by using a code word at the beginning of each data frame. The address is transmitted together with the data to be transmitted via the data line. However, the addressing must be re-issued every time the system is reconfigured.

In U.S. Pat. No. 5,732,074, a wireless communication between a CAN data bus installed in a motor vehicle and a control processor connected to the Internet is disclosed. The control processor can be addressed via the Internet Protocol addressing (IP Addr) normally used in the Internet. A component provided at the CAN data bus is assigned such an IP address so that it can be addressed from the Internet. Within the CAN data bus, however, the individual components are not addressed with a network or device address designating the components but with the identifier normally used in the CAN protocol which allocates a particular priority to each message. Thus, no address is issued for the destination component in the CAN, but the message itself is identified via the identifier and can thus be distinguished from the other messages. In principle, each of the messages is then received by each component, the components then selecting the individual messages on the basis of the identifier. In this arrangement, each component must contain a listing of which message having which identifier is to be received. In CAN, the messages are thus not concatinated with addresses which describe a certain destination component at the data bus, but with identifiers which designate a certain message. The CAN data bus does not have any addressing in the sense that destination addresses are issued.

German Patent document DE 40 37 143 A1 shows a control system with a central control device and a number of components which are networked together by means of a data bus for mutual communication. After the system has been switched on, each component determines its logical device address via an established method. Mutual addressing takes place via a data line of the data bus. If the entire system is switched on, for example via the ignition key, the components are supplied with power and each component determines its logical device address. The address issued by a component is transmitted together with the message in order to correlate the message with the selected component. The configuration of the overall system can be stored in a central control device and/or the individual components, independently of the operating voltage, and only needs to be newly interrogated and/or stored when it is first taken into operation and/or when a component is exchanged.

It is then the object of the present invention to develop the method initially mentioned in such a manner that differentiated addressing of the components can be performed, especially in the case of complex networks. In this arrangement, selected components should also be addressable in a simplified manner by another network, for example the Internet.

According to the invention, this object is achieved by providing that at least one particular component of the first network communicates with another network, that this component, when dialling into the second network, is assigned a second address by the latter and that, within the first network, addressing takes place on the basis of function-specific address components, identical function blocks of the components being addressed via identical function-specific address components.

According to the invention, it has been found that, in the case of complex data bus systems in transport means, the addressing of the individual components can be decisively improved if addressing takes place via a function-specific component of the address. The starting point for the invention are data buses in motor vehicles in which, in contrast to the CAN protocol, each component on the data bus is assigned an address. The problem then is that, in the case of an exchange of the components or of a disturbance, the destination addresses can change. The advantage with a function-specific addressing is that a component can be addressed via its main function block and, when components are exchanged, the device address changes but not the function.

Using optical data buses as a basis, a first type of addressing which uses the function-specific address components is provided within the data bus in addition to the standard communication, for example D2B or MOST protocol. In addition, the first addresses can be set up in the manner of the Internet Protocol so that it is possible within the data bus to perform addressing virtually as in the Internet, a part of this address, however, being the function-specific component.

Independently of this addressing within the data bus according to the invention, one of the components on the data bus is provided for communicating with another network, for example the Internet. When the communication is set up, this component then receives a second address which is assigned to it by the Internet. The first address of the component is not visible to the Internet for security reasons. A component of a network can then be advantageously addressed from another network without the local address or position of the component in the first network having to be known in the other network.

According to the invention, the component for the communication with the other network has two addresses, namely the first address for the communication within the data bus and the second address of the second network. The component which is to be addressable from the second network, for example a communication component, allocates the addresses in accordance with the direction of communication to one or the other network.

The addressing in a network, for example the data bus, can take place, on the one hand, via an address component which describes the local arrangement of the components along the data bus such as can be the case, for example, in the D2B or MOST protocol and/or via a function-specific address component which describes the function of a component or its subordinate function blocks. Most of the components are constructed as control devices, the function blocks designating certain units such as, for example, an amplifier or a unit which controls the car telephone. Each function block can consist of hardware and associated software.

The special feature of the method according to the invention then consists in that each component of the one network which is to be addressed is addressed via the function-specific address component of a function block. As a result, for example, the control device for the Internet communication or satellite navigation can be addressed within the data bus by using the function-specific address for the function group Internet communication or satellite navigation, respectively.

In this arrangement, two aspects are particularly advantageous. The first aspect consists in that the first address uses the function-specific address component for addressing a component in the first network. As a result, only the IP address of the component to be addressed and the desired function of the destination component, and not the location at which a component or function group is precisely arranged, needs to be known in the case of activation from another network, for example the Internet.

The second advantageous aspect consists in that a component of the first network is addressed via its main function block. As a result, an address related to the local arrangement can be avoided. In consequence, the first address does not change in the case of a reconfiguration in the first network as long as the main function block remains linked to the component. The addressing should support the supply of a number of similar components in different function groups with data even in the case of an exchange of individual components, for example during a maintenance process of the vehicle electronics. The main function block is preferably the function block characteristic of a component.

The first network is addressed from the second network, for example the Internet. In this event, only the component having an assigned second address, for example an Internet Protocol address is visible. This second address can be dynamically issued, for example by an Internet Provider, i.e. the component is assigned an address by the Internet when the connection is set up.

In a preferred further development of the invention, the Internet Protocol addressing is mapped to the first network. As a result, the components in the first network can also be addressed via the Internet Protocol addressing in addition to the usual standard addressing for the first network. During communication with the second network, the internal virtual IP addressing of the first network is then translated to the external IP addressing with which the Internet can be addressed within the communication component. As a result, the Internet Protocol can be used in the first network after the translation in the corresponding component communicating with the Internet. In consequence, for example, Internet applications, software and also Internet browsers can address the components of the first network and use their information. The internal addresses of the first network are issued by the network master by dummy characters in the central register and are established when the system is started.

When the system is powered up, especially when the motor vehicle is started, first addresses are successively loaded into a central register of a component. The component having the central register is designated as network master. Firstly, the logical address of a component adjacent to the network master at the network is stored in the central register. The next logical address which is stored in the central register is the component which locally follows with reference to the network. In this manner, the logical addresses of the components are successively stored in such a manner that the network node at which a component is arranged at the data bus is known on the basis of this logical address. As a result, the individual components can be addressed via the logical address component of the first addresses. The network components can advantageously evaluate the first addresses stored in the central register in order to check the configuration of the entire system.

In addition to the logical addressing of the components/ devices, the functional addressing is also provided. In this addressing, the components are subdivided into function blocks. In this manner, each function block can be addressed via the function-specific address component independently of the logical address of the component to which the function block is allocated. If a function block exists a number of times in the system, an additional identification address component is provided. If a function group exists a number of times in the system, it will be addressed via the function-specific component and via the identification address component during the function addressing.

As a result, the control devices, electrical circuits or the function blocks can be addressed via the data bus, and thus the data interface of the relevant control device, as an alternative to or in combination with the logical addressing via the function addressing. It can then be provided that the network node at which a component is arranged is addressed via the logical addressing and the relevant function block at the data bus is addressed via the function-specific address component.

In a further development of the present invention, a further address component of the address is issued by the network master, from which one of various similar components is unambiguously determined. This so-called identification address component is preferably a code word, for example a natural number, which in each case identifies identical or similar function blocks of one or more components in ascending order for mutual differentiation. The number "0" is issued to a function group, for example, if the latter occurs only once in the entire system. The next higher number is issued, for example, to the next function block registering with the central component if there is a number of these function blocks in the system.

When the system is powered up for the first time, the addresses relating to a component are copied by the network master via the data bus and stored in the interrogating component in the decentralized memory. A system according to the present description preferably consists of a network master which receives the addresses of all components on reconfiguration or on power-up of the system, and other components which only store the addresses of other components which relate to themselves in each case. The network master preferably has a central register in the memory area into which the addresses of all components are transferred. This transfer occurs during the system power-up by transmission of the addresses from the individual components to the network master or possibly from an external computer via an interface to the data bus and then to the network master or directly from the computer via an interface to the network master.

In the case of a reconfiguration of the system, the addresses copied by the centralized component via the data bus are stored in a decentralized memory of the relevant component. Whenever the system is taken into operation, that is to say after the operating voltages have been applied or when the vehicle starts, all components interrogate the network master for the addresses relating to them. When the system is newly assembled or, in the case of a reconfiguration, the addresses are copied by the network master via the data bus and stored in the decentralized registers in the memory of the other components. If the centrally stored addresses of the components differ from the addresses in the central register of the network master, for example in the case of a new start of a vehicle, the corresponding addresses are newly determined and copied via the data bus.

In a second further development of the invention, the coding rule of the IP addresses is only known to a centralized component, especially the network master. If IP communication is to be possible, the other components must interrogate the centralized component for this IP address. To prevent misuse, the main function block is also transmitted from the interrogating component to the centralized component, according to the invention, during the interrogation. In the centralized component, a configuration list is stored in which the main function block is entered which is assigned an Intranet or local IP address. This IP address is formed from the individual address components, especially the main function block and the other address components provided for the interrogating component in the list of the network master during the first power-up of the system. The centralized component checks the main function block of the interrogating component by means of the central list and, if the interrogating component is authorized, assigns to it the corresponding IP address. Finally, the assigned IP address is transmitted back to the interrogating component.

Other objects, advantages and novel features of the present invention will become apparent from the following detailed description of the invention when considered in conjunction with the accompanying drawings.

BRIEF DESCRIPTION OF THE DRAWINGS

FIG. 2 is a table containing a simplified representation of an allocation of addresses to different components as can be stored in the central register according to the invention.

DETAILED DESCRIPTION OF THE DRAWINGS

Figure 1:
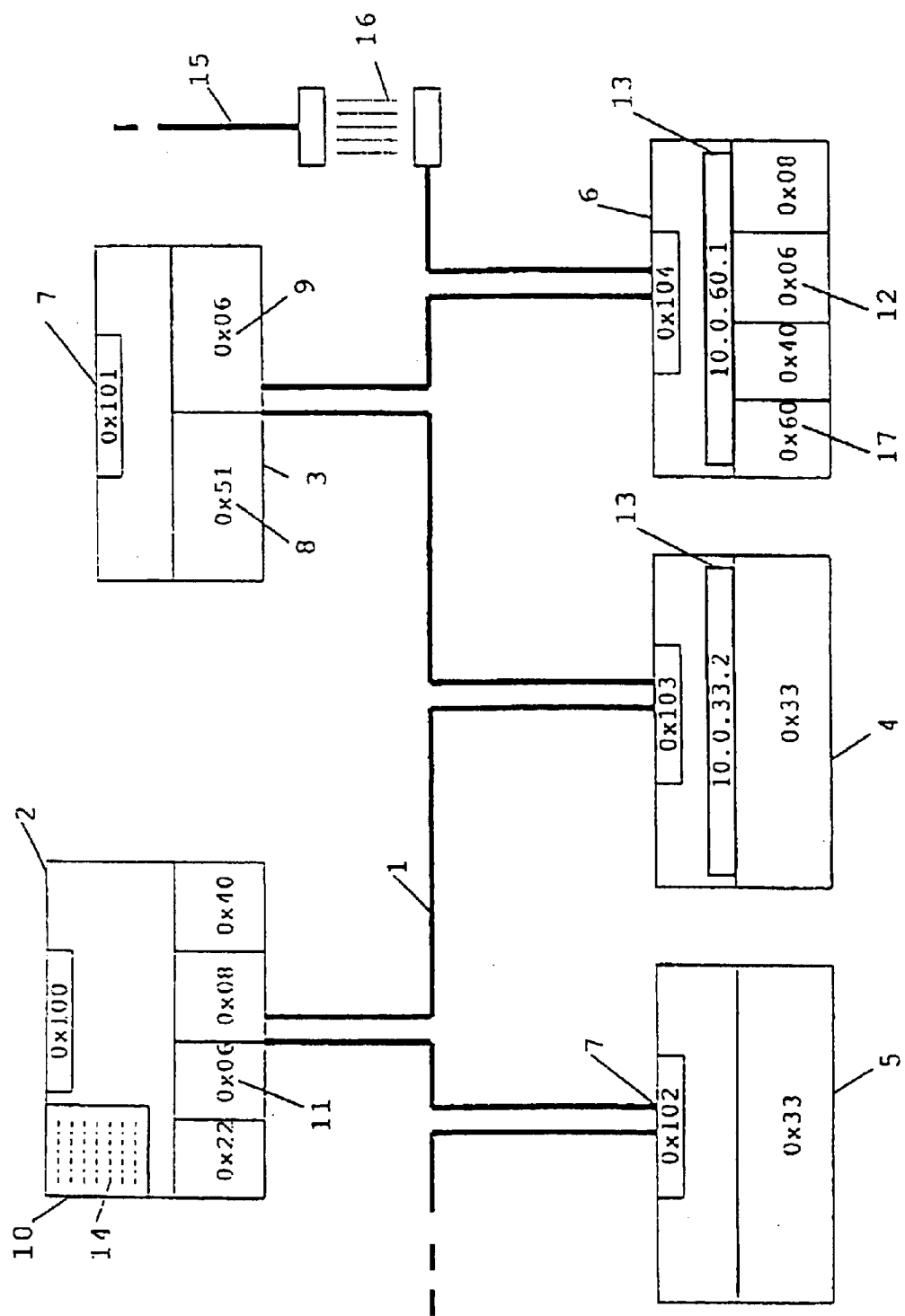
FIG. 1 is a diagrammatic representation of the data bus with a number of control devices to which the method according to the invention in each case assigns an additional address.

FIG. 1 shows a system which is used, for example, in motor vehicles. A number of components 2 to 6 are connected via a data bus 1. One component is a network master 2, i.e. a control device, which is connected to the other components, the control devices 3 to 6, via the data bus 1.

The network master 2 administers the addresses for the mutual addressing of the individual components 2 to 6. The data bus 1 is a synchronous data bus which enables synchronous and asynchronous data to be transmitted mutually between the individual control devices 2 to 6. In this arrangement, the data transmission is tied to a higher-level system time, for example, i.e. each component sends a message in a time slot on the data bus 1. In the case of collisions, the control device then repeats the data transmission.

The data bus 1 can be a two-wire bus in the form of the asynchronous CAN bus or an optical data bus 1. In the illustrative embodiment, the data bus 1 is an optical D2B or MOST data bus with basically time-synchronous data transmission. On the other hand, the addressing according to the invention can also be performed in any other data bus 1 in which the addressing of the individual components 2 to 6 takes place via at least one data line of the data bus 1.

The data bus 1 connects the network master 2 to the other components 3 to 6 which, in each case, contain system functions in hardware and software which are required in the motor vehicle. The network master 2 can be constructed as a standard control device with a special function for the address processing and/or the data management. The individual components 3 to 6 are control devices configured in accordance with their use. A control device 3 can be provided, for example, for the function of a vehicle telephone and be connected to a second control device 4 via the data bus 1. The system functions of the individual control devices 2 to 6 and of other electronic components, (not shown), which can communicate directly with the data bus 1, are registered via the data bus 1. At the data bus 1, the tasks can be provided preferably distributed in the individual components. The other components 3 to 6 can have further master functions, for example a timing master function for the system clock and a connection master function for the logical connections between the components 2 to 6.

Each control device 2 to 6 and every other component connected to the data bus 1 is assigned a first address which, on the one hand, can specify the physical location of the component and, on the other hand, also its functional association. To designate the physical location of the control device 3, a logical address 7, 0x101 in the example, is assigned within the system. In the example, the address 7 is an address stored in hexadecimal code, the address assigned depending on the system and only being specified by way of example in this case. The network master 2 can determine the position of the relevant component 2 to 6 due to the address formation used at the data bus 1 or the order of registration at the data bus 1 due to the logical addressing.

The control device 3 has two function blocks 8, 9 which are functionally addressed by means of a function-specific address component 0x51 and 0x06, respectively. The function block 8 can be addressed via the function-specific address component 0x51 and a further function block 9 can be addressed via the function-specific address component 0x06. The functionalities can be restricted to individual hardware components having the corresponding software but can also address an entire hardware group. A hardware group can consist of control devices 3 to 5 with routines, sensors and actuators.

Once the system consisting of data bus 1 and the control devices 2 to 6 has been powered up and is initialized, communication can take place between the individual components 2 to 6. During system power-up, that is to say before the actual data transmission, the logical addresses 7 of the control devices 2 to 6 are determined and stored in the memory area in a central register 10 of the centralized control device 2. The network master 2 stores all address components or addresses assigned to the components 2 to 6 in its central register 10 from which the other components 3 to 6 can interrogate the total system configuration. All other control devices 3 to 6 are hierarchically subordinate to the network master 2 with respect to the addressing and generate their own logical addresses on first system power-up. The initialization addresses are interrogated from the network master 2 during new configuration and are then transmitted to the central register 10 in order to document the system configuration via the addressing. As an alternative, the individual components can also receive their initialization addresses from the network master.

Apart from the function-specific address components 0x06, 0x51 for addressing the function blocks 8, 9, the number of matching function blocks in the system is also stored in the central register 10 by means of an identification address component. When matching function blocks 9, 11, 12 occur a number of times, the identification address component of the address specifies the number of identical function blocks 9, 11, 12 which exist on the data bus 1. It is also possible to increment the identification address component with each new function block in accordance with its occurrence during the registration at the data bus 1.

The identification address component of the address is dynamically formed by the network master 2 in accordance with the arrival of the status message during the initialization of the system. In the simplest case, the identification address component is formed as a code number and is in each case issued in ascending order in accordance with the order in which the status message arrives at the control device 2 via data bus 1 from the individual components 3 to 6 during intialization. If a function block exists only once in the system, for example, a "0" is provided as code number. If there are a number of components or function blocks of similar function types in the system, the identification address component is established in ascending order in the form of natural numbers, the component detected first during the initialization being identified by a "1". In the illustrative embodiment, the range of values provided for the identification address component of the address is between 1 and 254.

In the central register 10, the first address is in each case stored in the form of a quasi-Internet Protocol address (IP address) 13 for each component which is to be called up by a second network, especially the Internet 15. In this arrangement, the IP address 13 consists of a network address component by means of which a certain address is allocated to each network, and of the function-specific address component by means of which the component 4 or, respectively, 6 is directly addressed from the point of view of the second network, especially the Internet 15. The external IP addresses are translated into internal IP addresses, i.e. into the first addresses, in component 4 and 6, respectively, both being formed in accordance with the Internet Protocol. Inasmuch as quasi-IP addressing is mentioned in the description, this means the internal IP addressing or, respectively, first address within the first network. The function-specific address component of the quasi-IP addressing preferably corresponds to the function-specific address component which is used for addressing the function blocks in data bus 1.

After the address components 14 have been generated in the central register 10, the control device 2 sends a status signal to the various components 3 to 6 via the data bus 1, the status signal specifying that the central register 10 has been configured. Components 3 to 6 in the system thereupon request a copy of the central register 10 from the network master 2, and either the entire information of the central register 10 or only the information relating to components 3 to 6 themselves is stored in the decentralized memory in the components 3 to 6.

If the configuration of the system has changed since the last system start, for example due to a short circuit to ground or by adding or removing a component 3 to 6, the control device 2, after checking the configuration, sends a message via the data bus 1 to the other components 3 to 6 which describes an improper configuration of the system. This leads to the components 3 to 6 discarding their decentralized storing of the addresses, requesting a new copy from the network master 2 and then storing the addresses again in their own decentralized memory area.

Apart from the first address 13 internal to the bus which has at least one function-specific component 11, a component 4 or 6 of the system, for example a communication control device, is also assigned another second external IP address. According to the invention, the component 4 or 6 then has two addresses. The first address 13 internal to the bus is issued on the basis of the system configuration in the first network and the second external IP address is issued by the provider on the basis of the Internet address. As a result, the first address 13 is dependent on the functionality of a component 2 to 6 and not on its location on the data bus, which is assigned later in the motor vehicle. During communication with the external other network, for example the Internet 15, only one component 4 or 6 is visible in the illustrative embodiment, namely the one which has an internal IP address and an external IP address. Translation from the internal to the external IP addressing is done for shielding the first network. The Internet 15 can be connected to the data bus 1 via a radio transmission link 16, for example via a mobile telephone.

In the central register 10, all device-specific information is stored in the form of address components (logical address, identification-specific and/or function-specific address component, etc.) so that a statement on the total configuration of the system consisting of the individual components 1 to 6, 8, 9, 11, 12 can be made on the basis of the stored addresses 14. At least one of the components 2 to 6 has executable functions in order to interrogate the necessary information from the other components 3 to 6. In the network master 2, a correlation is preferably stored about which components 2 to 6 have main function blocks 17 and which components 2 to 6 receive a quasi-IP address or, respectively, first address 13.

FIG. 2 shows a list with address components 14, stored in the central register 10, in a simplified diagrammatic representation. In this example, the first two columns are interrogated by the network master 2 during the system initialization. In the third and fourth columns, the possible address components calculated by the network master 2 itself, for example the identification address component and/or the quasi-IP addresses or, respectively, first addresses 13 are stored. The respective component 4 or 6 of the system can then be addressed by any component 2 to 6 of the first network 1 via the quasi-IP addresses 13.

Each IP address 13 consists of a static component and a dynamic component. The static component comprises the network component which designates the respective network 1, 15 which is to be addressed. This part of the address can also be programmed even during the production of the components 2 to 6. The individual address components are appended to one another in accordance with an address coding rule. The two dynamic address components to be determined by the network master 2 are composed of the function-specific component and the identification address component. The address coding rule for generating a complete IP address 13 for the Internet Protocol-based data transmission between a source component and a destination component is as follows:

IP address=NetworkAddr. FunctionAddr. InstAddr+1 where the IP address is the second address 13, NetworkAddr designates the network address component, FunctionAddr designates the function-specific address component, for example of a main function block of a component 2 to 6, and InstAddr designates the identification address component. To prevent any unauthorized access by a communication from the second network 15 to the data bus 1, the central register 10 of the network master 2 contains information on which main function components 17 can receive an address. When messages are received, their access authorization and their syntax can be checked in this manner. According to the Internet Protocol standard, the address 10.0.n.n, for example, is reserved for the network address component within local networks such as a data bus 1, where n is in each case an address component without 0 and 255 which can be arbitrarily issued.

As can be seen in FIG. 2, component 2 with the logical address 0×100 has the function blocks with the function-specific address components 0×22, 0×06, 0×08 and 0×40 via which the individual function blocks within the data bus 1 are addressed. The function block having the address 0×22 exists only once in the entire system so that it is designated with the identification address component 0 of the address. In the illustrative embodiment, the function block 0×22 is an amplifier associated with component 2. The other function blocks exist several times in the entire system and receive the identification address component InstAddr=1 if they were the first to register at the network master 2 during power-up or as function block of the network master 2 itself.

The identification address component InstAddr specifies how many identical function blocks there are in the system and which of these function blocks existing several times is to be addressed. Due to the address component of the function block 0×22, the relevant function block is identified as amplifier and correspondingly entered in the central register 10 or in the decentralized registers of the other components 3 to 6.

If necessary, the function blocks are addressed via the respective function-specific address component if it is intended to provide communication via the data bus 1. Each component 4 or 6 provided for the communication with the other network 15 is automatically assigned a second IP address 13 by an address generating means. Communication with the other network is usually not provided for each component which is addressed by its main function block 17 or for each function block. In the example, component 6 has the main function block 17, for example 0×60 and is addressed via this main function block 17. In the illustrative embodiment, the IP address 13 of component 6 is IP Addr=10.0.60.1, as a result of which the control device 6 of the system can be addressed from the external Internet 15. The function blocks 12 belonging to this component can then be selected, for example, via the function-specific address component or another method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for addressing components of a first network in a data bus system in a transport vehicle, in which each component is assigned a first address for mutual communication within the network and the first addresses are stored in a central register, wherein at least one particular component of the first network communicates with a second network, said one component, when dialling into the second network, is assigned a second address by the second network, and wherein, within the first network, addressing takes place on the basis of function-specific address components, identical function blocks of the components being addressed via identical function-specific address components.

2. Method according to claim 1, wherein a component of the first network registers a communication with the second network with the at least one particular component which communicates with the second network, whereupon a component of the at least one particular component, with the internal address from the first network, enables communication with an external IP address and thereupon sets up communication with the second network.

3. Method according to claim 1, wherein the components evaluate the first addresses stored in the central register in order to check a configuration of the first network.

4. Method according to claim 1, wherein, during system power-up, addresses and/or address components relating to a component are copied by the central register via the data bus and are compared with address information stored in a respective decentralized memory in each component.

5. Method according to claim 4, wherein in the case of a new configuration of the data bus system, the addresses copied by the central register via the data bus are stored in a memory of each component.

6. Method according to claim 1, wherein data are transmitted via an optical data bus.

7. The method according to claim 6, wherein the optical data bus is one of a D2B or MOST data bus.

8. Method according to claim 1, wherein, before an actual data transmission via the data bus during system power-up or after reception of a status signal, stored addresses or address components are matched in registers of the components of the first network and/or function groups of the first network in accordance with the stored addresses of the central register.

9. Method according to claim 1, wherein an IP address of a requesting component is obtained from the central register by using a special instruction in the system.

10. Method according to claim 1, wherein the second network is external to the vehicle, the first address assigned to each component specifies a physical location and/or a functional association of each component, the first address is issued based on configuration of the data bus system, and the second address is based on an Internet address.

11. Method for addressing components of a first network, in a data bus system in a transport vehicle, in which each component is assigned a first address for mutual communication within the network and the first addresses are stored in a central register, wherein external IP addresses are issued to components which are authorized on the basis of an entry in a configuration list in a centralized component, and wherein proof about the authorization is made via a main function block transmitted with a request.

12. Method according to claim 11, wherein the main function block is also transmitted from an interrogating component to the centralized component during the interrogation, and the IP address is formed from the main function block and other address components of the interrogating component.

13. Method according to claim 11, wherein a component of the first network registers a communication with a second network with a component which is visible from outside the first network, whereupon the a component of the component which is visible, with the internal address from the first network, enables communication with an external IP address and thereupon sets up communication with the second network.

14. Method according to claim 11, wherein the components evaluate the first addresses stored in the central register in order to check a configuration of the first network.

15. Method according to claim 11, wherein, during system power-up, the addresses and/or address components relating to a component are copied by the central register via the data bus and are compared with address information stored in a respective decentralized memory in each component.

16. Method according to claim 15, wherein in the case of a new configuration of the data bus system, the addresses copied by the central register via the data bus are stored in a memory of each component.

17. Method according to claim 11, wherein data are transmitted via an optical data bus.

18. The method according to claim 17, wherein the optical data bus is one of a D2B or MOST data bus.

19. Method according to claim 11, wherein, before an actual data transmission via the data bus during system power-up or after reception of a status signal, the stored addresses or address components are matched in registers of the components of the first network and/or function groups of the first network in accordance with the stored addresses of the central register.

20. Method according to claim 11, wherein IP address of the requesting component are obtained from the central resister by using a special instruction in the system.

21. Method for addressing components of a first network in a databus system in a transport vehicle, the method comprising:

assigning, to each component, a logical address and a function specific address component;

assigning, to each component, a first address for mutual communication within the network, wherein the first address comprises the logical address and/or function specific address component;

storing the first addresses in a central register;

assigning, to at least one particular component of the first network which communicates with a second network, a second address by the second network when dialling into the second network; and wherein addressing within the first network takes place on the basis of the function-specific address components, identical function blocks of the components being addressed via identical function-specific address components.

22. Method according to claim 21 comprising:

registering, by a component of the first network, a communication with the second network with the at least one particular component which communicates with the second network, whereupon a component of the at least one component enables communication with an external IP address and thereupon sets up communication with the second network.

* * * * *